US00RE40780E

(19) United States
(12) Reissued Patent
Leuca et al.

(10) Patent Number: US RE40,780 E
(45) Date of Reissued Patent: Jun. 23, 2009

(54) METHOD OF WIRELESS RETRIEVAL OF INFORMATION

(75) Inventors: Ileana A. Leuca, Bellevue, WA (US); Adrian Smith, Bellevue, WA (US)

(73) Assignee: AT&T Mobility II LLC, Atlanta, GA (US)

(21) Appl. No.: 10/419,098

(22) Filed: Jun. 9, 2003

Related U.S. Patent Documents

Reissue of:
(64) Patent No.: 6,493,430
Issued: Dec. 10, 2002
Appl. No.: 08/777,983
Filed: Dec. 24, 1996

(51) Int. Cl.
*H04M 1/64* (2006.01)
*H04M 3/42* (2006.01)

(52) U.S. Cl. ..... 379/88.12; 342/457; 379/88.11; 379/88.17; 379/88.22; 379/201.02; 379/207.02; 455/412.1; 455/415; 455/466; 455/517

(58) Field of Classification Search ..... 379/67.1, 379/88.11, 88.12, 88.13, 88.14, 88.15, 88.17, 379/88.19, 88.2, 88.22, 201.02, 207.02; 342/457; 455/412.1, 415, 466, 517
See application file for complete search history.

(56) References Cited

U.S. PATENT DOCUMENTS 5,131,020 A * 7/1992 Liebesny et al. ..... 379/59
5,327,554 A * 7/1994 Palazzi, III et al. ..... 395/600
5,351,235 A * 9/1994 Lahtinen ..... 370/58.1
5,396,543 A * 3/1995 Beeson, Jr. et al. ..... 379/59
5,459,779 A * 10/1995 Backaus et al. ..... 379/201
5,519,780 A * 5/1996 Woo et al. ..... 380/49
5,550,907 A * 8/1996 Carlsen ..... 379/207
5,559,860 A * 9/1996 Mizikovsky ..... 379/58
5,577,102 A * 11/1996 Koivunen ..... 379/59
5,577,103 A * 11/1996 Foti ..... 379/59
5,604,744 A * 2/1997 Andersson et al. ..... 370/347
5,604,921 A * 2/1997 Alanara ..... 455/45
5,719,918 A * 2/1998 Serbetciouglu et al. ..... 379/58
5,742,905 A * 4/1998 Pepe et al. ..... 455/461
5,768,276 A * 6/1998 Diachina et al. ..... 370/432
5,768,509 A * 6/1998 Gunluk ..... 393/200.33
5,794,142 A * 8/1998 Vanttila et al. ..... 455/419
5,794,156 A * 8/1998 Alanara ..... 455/517
5,835,061 A * 11/1998 Stewart ..... 342/457
5,835,583 A * 11/1998 Hetz et al. ..... 379/220
5,870,089 A * 2/1999 Fabbio et al. ..... 345/335
5,878,397 A * 3/1999 Stille et al. ..... 704/466
5,903,832 A * 5/1999 Seppanen et al. ..... 455/414
5,905,959 A * 5/1999 Foladare et al. ..... 455/445
5,959,543 A * 9/1999 LaPorta et al. ..... 340/825.44
5,974,300 A * 10/1999 LaPorta et al. ..... 455/31.2
6,014,429 A * 1/2000 LaPorta et al. ..... 379/88.15
6,047,327 A * 4/2000 Tso et al. ..... 709/232
6,085,101 A * 7/2000 Jain et al. ..... 455/500

FOREIGN PATENT DOCUMENTS

WO WO 97/41654 * 11/1997

* cited by examiner

*Primary Examiner*—Gerald Gauthier
(74) *Attorney, Agent, or Firm*—Kenyon & Kenyon LLP

(57) ABSTRACT

A mobile station subscriber can access data from an informational database and have it forwarded to a desired destination. A database associated with the informational database maintains subscriber profiles. When the informational database receives a data request, it uses a mobile station identifier to acquire subscriber profile information. Using that profile information, the requested data is forwarded to a destination designated in the profile in a SMS format.

28 Claims, 2 Drawing Sheets

METHOD OF WIRELESS RETRIEVAL OF INFORMATION

Matter enclosed in heavy brackets [ ] appears in the original patent but forms no part of this reissue specification; matter printed in italics indicates the additions made by reissue.

*Notice: More that one reissue application has been filed for the reissue of Pat. No. 6,493,430. The reissue applications are the present application, application No. 10/419,098 filed Jun. 9, 2003, and application No. 11/430,300 filed May 9, 2006, which is a divisional of reissue application No. 10/419,098.*

BACKGROUND OF THE INVENTION

The present invention is directed to a method for wireless retrieval of information. More particularly, the invention is directed to a method of providing data from an information database in response to a request from a mobile station on a wireless network.

It is known in the prior art that an information service provider can establish a database which can be accessed by subscribers to obtain particular desired information. Such information might include news, weather, traffic, etc. One configuration for providing such information to a subscriber is illustrated in FIG. 1A. In that configuration a subscriber computer 100 is connected via modem 101 to the public switched telephone network (PSTN) 1 and through that network to a database service provider 102. A subscriber at computer 100 can generate queries or requests that are transmitted to the database service provider which then provides a response back to the subscriber.

While this configuration can be helpful to a subscriber who has a computer and a connection to the PSTN, access to these informational databases or information service providers is otherwise still somewhat limited.

In today's world the use of wireless communications continues to expand at a rapid pace. More and more people have cellular phones which provide them with mobile communication in an ever expanding wireless environment. However, at present there is no configuration in the wireless environment that facilitates the access of a database of an information service provider via a mobile station.

It is known that with the enhanced functionality available to mobile stations, such as prescribed by a protocol referred to as IS-136, messages packets can be sent to a wireless communication devices operating within the protocol. In particular, this type of messaging is referred to as a Short Messaging Service (SMS).

FIG. 1B illustrates a known wireless arrangement for providing short messages in accordance with the IS-136 protocol. In that arrangement a mobile station 110 is in wireless communication with a base station 120. The base station is coupled to a mobile switching center (MSC) 130. A message center (MC) 146 is coupled to the MS 130. The message center stores messages for mobile units and may use a personal identification number (PIN) that is associated with a given subscriber to correlate messages and subscribers. The message center then forwards the messages to the designated mobile station via MSC 130 and base station 120 in a format known as the Short Message Services (SMS) Format. This format is well known in the art and is described in the IS-136 protocol.

To date, no one has explored how implementation of the Short Messaging Service could enhance the ability of a subscriber to retrieve information.

SUMMARY OF THE INVENTION

The present invention provides a system and method for facilitating access to informational databases from a mobile station. In one embodiment, a subscriber uses a mobile station to place a call via the wireless network and a PSTN to an information service provider. An identification of the mobile station, such as a calling number ID is also forwarded to the information service provider. That provider can then use the calling number ID to retrieve a user personal identification number (PIN) or user identification number. The subscriber then, via activation of keys on the keypad of the mobile station, makes selections of the particular pieces of information which are desired. Subsequently, the database information service provider constructs a message containing the desired data and the appropriate PIN or user identification number and forwards that to a message center. The message center then forwards the data from the information service provider in accordance with the Short Message Service format.

As a consequence of this arrangement, a mobile station has the flexibility to request data from a database service provider and have the data sent directly to the mobile station using a messaging technique which is now available.

DETAILED DESCRIPTION

Figure 2:
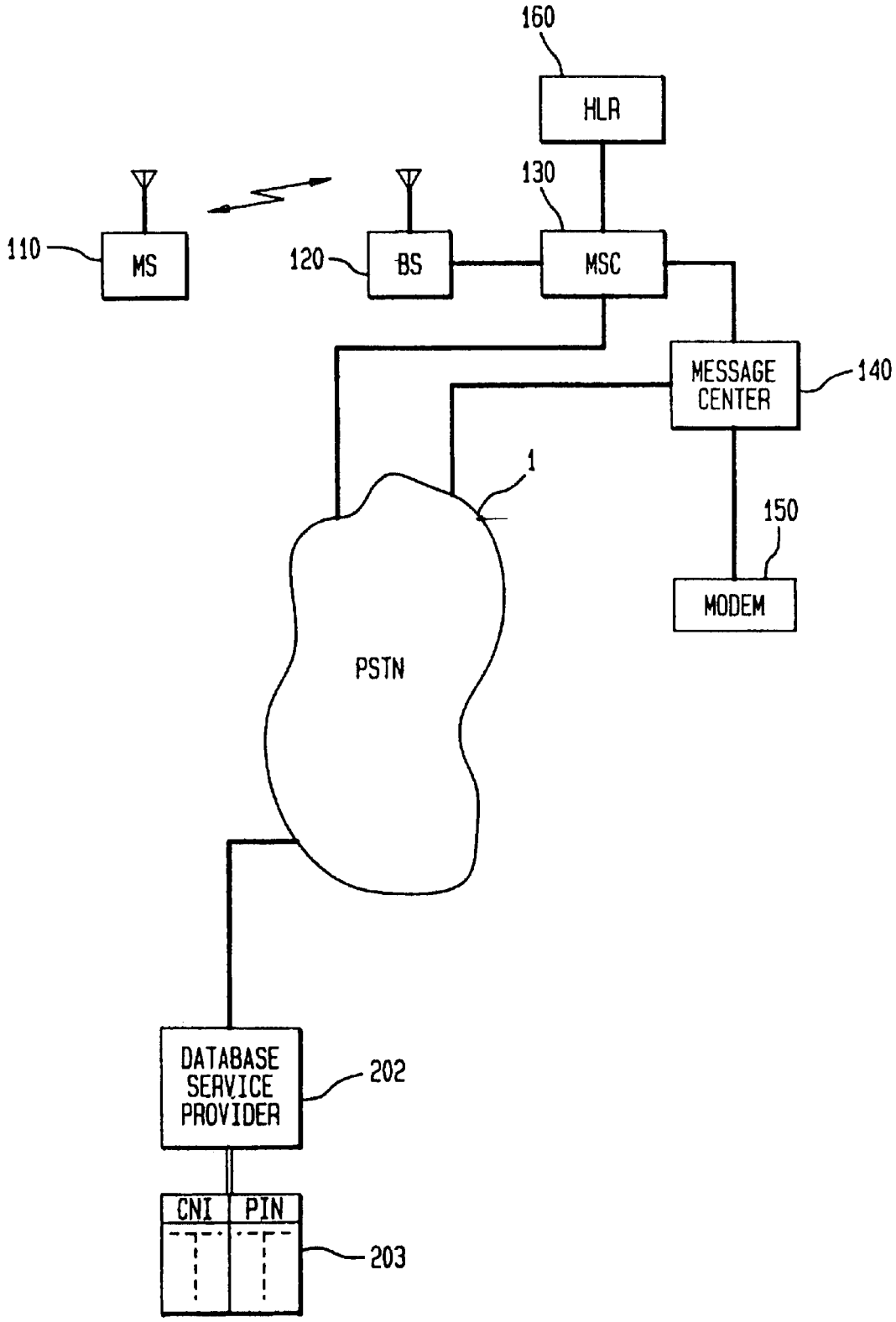
FIG. 2 illustrates an embodiment of the present invention.

In accordance with the present invention, the known configuration for providing SMS formatted data to a mobile station is employed to enhance a mobile station's capability of retrieving data from an informational database. An embodiment of the present invention is illustrated in FIG. 2

Figure 1A:
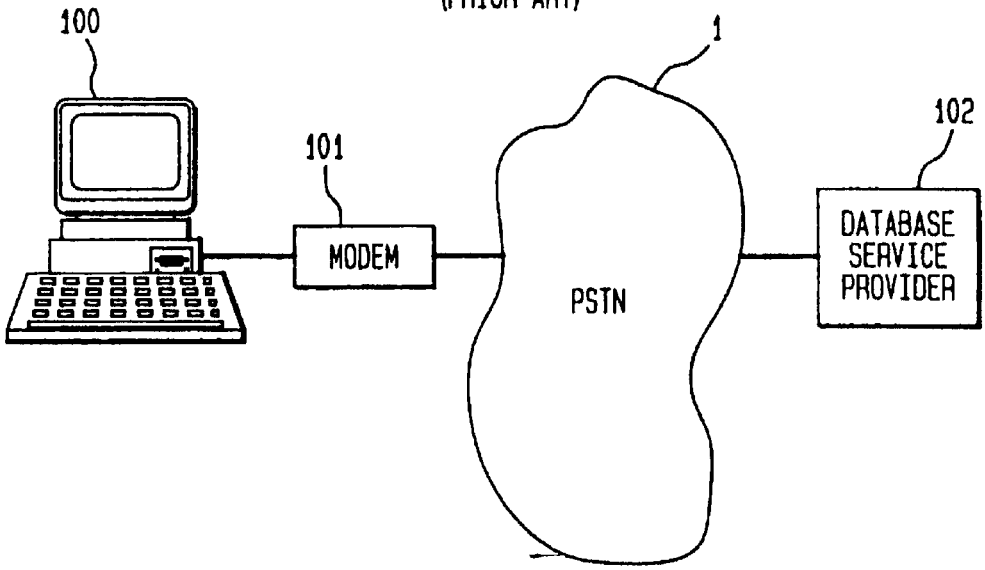
FIG. 1A (PRIOR ART)
FIG. 1A illustrates a known configuration for accessing information from a database service provider.
Figure 1B:
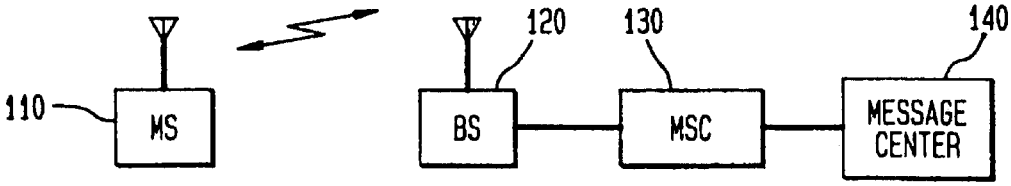
FIG. 1B (PRIOR ART)
FIG. 1B illustrates a known configuration for providing short message service to mobile stations.

Elements which are identical in the drawing figures bear identical reference numerals. The present embodiment employs the same mobile station, base station, MSC and message center as provided in the known arrangement of FIG. 1B. However, in the present invention, the mobile station communicates via base station 120, MSC 130 and PSTN 1 with the information or database service provider 202. In this communication the mobile station can place a request for a particular type of data, for example, news information, sports, weather, traffic or any other data which may be of interest to the subscriber at the mobile station. As described above, the request can be processed in a known fashion, that is the database service provider may provide the subscriber with voice prompts or menu options for selecting desired data and the subscriber at the mobile station may make selections using either voice responses or responses on the keypad of the mobile station.

In addition to the request for information, the database service provider also receives an identification of the mobile station, namely the calling number identification (CNI). The CNI can be forwarded from a database that associates such information with respective mobile stations. The database service provider than uses the CNI to access information to identify where the requested data should be transmitted. In particular, the service provider can access a table such as that shown in element 203 which constitutes a subscriber profile and correlates a subscriber's CNI with a personal identification number (PIN) which identifies the subscriber and as a consequence provides access to the subscriber's message center which should receive the requested data. The service provider then constructs a message to be transmitted to the message center associated with the subscriber. This message can be constructed either during the course of a call with the mobile station or at some time after the call is completed. The message includes the data requested as well as the PIN. Alternatively, the MIN (mobile identification number) may provide sufficient information to identify the subscriber. In such a case the message would include the data and the MIN. The database service provider then outputs the data via the PSTN 1 to the designated message center 140. The message center stores the message, that is the requested data, in memory associated with the mobile station identified by the PIN or MIN. The messages would be stored in a format that corresponds to the SMS format described in the IS-136 protocol. The message center can then transfer the message packet(s) to the designated mobile station in accordance with known short message service techniques.

In the embodiment described, the information is sent directly to the mobile station which requested it. However, this need not always be the case. In fact, the information is sent to the destination defined by the subscriber profile associated with the CNI in table 203. Therefore, it is possible that a given subscriber could have a customer profile that designates its own mobile station as the intended receiver of the information as described above. Alternatively, the CNI could be correlated with a PIN that designates that the information should ultimately be faxed to the end user at some designated location or it could be stored for later downloading by the end user.

In still a further modification to the disclosed embodiment, it is possible that the Internet could be used as the basis of the information. In that configuration, a database service provider could be considered an information server that has access to the Internet and obtains information from the Internet as requested by the subscriber. Then the information server would create the appropriate message packages and forward those to the message center based on the PIN associated with the calling party identification number or CNI. In this circumstance the information server might contain: a database of subscriber CNIs and PINs or MINs; dial up software to connect to the message center; software for connection to the Internet to download requested information such as news, weather, sports, traffic, etc.; software to format the information into the appropriate-sized messages to satisfy the protocol; and the ability to detect the CNI.

Other information which may be stored in the user profile can relate to the name of the user, a wire-line phone number, a CNI, an e-mail address, a fax number, etc. and any of this user profile information may be used to direct the flow of data from the information server to the subscriber.

In yet another embodiment of the present invention, the subscriber does not provide a request to a third party, but instead actually sends a request for information to the message center. In this circumstance, the message center acts as an "internal" information service provider. This may be particularly beneficial to a subscriber when circumstances arise where there may be long queues for sending messages at the message center. In this circumstance, the message center would receive a call from the mobile station, it would correlate the CNI with the PIN or MIN and receive a request for transmission of any messages which are pending. The message center would then be activated to respond to these active requests so as to provide the stored messages to the mobile station.

Thus, in accordance with the present invention, a mobile station can achieve access to any one of a variety of information services providers so long as those service providers can correlate a calling number identification of the mobile station with a PIN user identification for a message center to which the mobile station may be coupled and so long as the service provider supports SMS messaging.

What is claimed is:

1. A method of providing data from an informational database, comprising the steps of:

receiving a call from a mobile station on a wireless network;

receiving an [indentifier] *identifier* of the mobile station;

using said identifier to access a subscriber profile;

presenting data type options to a user of the mobile station;

receiving a request for data of a selected data type option during said call; and transmitting, to a destination determined by said subscriber profile, SMS formatted data corresponding to said requested data.

2. The method of claim 1 wherein said step of transmitting includes the substeps of:

appending an identification number from said subscriber profile to the requested data;

transmitting the requested data and identification number to a message center within [said] *a* group of destinations; and forwarding SMS formatted data from the message center to said destination.

3. The method of claim 1 wherein said destination [group] includes said mobile station.

4. The method of claim 1, wherein the subscriber identifier corresponds to said mobile station identifier.

5. The method of claim 1, wherein the data destination information includes a mobile identification number.

6. The method of claim 1, wherein the data destination information includes a telephone number.

7. The method of claim 1, wherein the data destination information includes a communications network address.

8. The method of claim 7, wherein the data destination information includes an electronic mail address.

9. The method of claim 1, wherein said data type options are selected from a group of news, sports, weather and traffic.

10. A method for providing data from an informational database, comprising the steps of:

presenting data type options to a mobile station;

receiving a request for data of a selected data type option, said request originating from the mobile station;

receiving an identifier of the mobile station;

selecting a destination for data transfer based on the received identifier;

transmitting SMS formatted data corresponding to the requested data to the selected destination.

11. The method of claim 10 wherein said selected destination is the mobile station.

12. The method of claim 10 wherein said selected destination [group] includes another mobile station.

13. The method of claim 10 wherein said step of receiving a request comprises the substeps of:

receiving a call from the mobile station;

presenting data selection options to the mobile station; and receiving a selection in response to the presentation of said options.

14. The method of claim 10, wherein said data type options are selected from a group of news, sports, weather and traffic.

15. A method of providing data in response to a request from a mobile station comprising the steps of:

in a first communication, receiving a mobile station identifier;

accessing a subscriber profile using said mobile station identifier;

presenting data type options to the mobile station identified by the mobile station identifier;

generating a message containing requested data of a selected data type option; and transmitting, in a second communication, said message to a destination determined by said subscriber profile.

16. The method of claim 15 wherein said message comprises Short Messaging Service formatted data.

17. The method of claim 15 wherein said destination [group] includes another mobile station.

18. The method of claim 15 wherein the step of transmitting includes the substeps of:

transmitting the generated message to a message center within [said] *a* group of destinations; and forwarding the requested data from the message center to said destination.

19. The method of claim 18 wherein in the substep of forwarding, the requested data is Short Messaging Service formatted.

20. The method of claim 15, wherein the data destination information includes a telephone number.

21. The method of claim 15, wherein the data destination information includes a communications network address.

22. The method of claim 15, wherein the subscriber identifier corresponds to said mobile station identifier.

23. The method of claim 15, wherein said data type options are selected from a group of news, sports, weather and traffic.

24. A method of providing information from a database, comprising:

presenting data type options to a user of the mobile station;

receiving a call from a mobile station, the call including a request for data of a selected data type option;

receiving a mobile station identifier;

accessing a subscriber profile having a subscriber identifier and data destination information using the mobile station identifier;

selecting a destination from a group of destinations using the data destination information; and transmitting the information corresponding to the data requested by the request to the selected destination.

25. The method of claim 24, wherein said data type options are selected from a group of news, sports, weather and traffic.

*26. A method of providing data from an informational database, comprising the steps of:*

*receiving a call from a mobile station on a wireless network;*

*receiving an identifier of the mobile station;*

*using said identifier to access a subscriber profile;*

*receiving a request for data of a selected data type option during said call, data type options having been presented to a user of the mobile station; and*

*transmitting, to a destination determined by said subscriber profile, SMS formatted data corresponding to said requested data.*

*27. The method of claim 26, wherein said destination includes the mobile station.*

*28. The method of claim 26, wherein said data type options are selected from a group of news, sports, weather and traffic.*

* * * * *